US008508771B2

(12) United States Patent
Ushiku (10) Patent No.: US 8,508,771 B2
(45) Date of Patent: Aug. 13, 2013

(54) CONTROL OF JOB INFORMATION RECORDING BASED ON WHETHER LOGGED IN USER CHANGES

(75) Inventor: Toru Ushiku, Tokyo (JP)

(73) Assignee: Canon Kabushiki Kaisha (JP)

( * ) Notice: Subject to any disclaimer, the term of this patent is extended or adjusted under 35 U.S.C. 154(b) by 875 days.

(21) Appl. No.: 12/551,733

(22) Filed: Sep. 1, 2009

(65) Prior Publication Data

US 2010/0053661 A1 Mar. 4, 2010

(30) Foreign Application Priority Data

Sep. 1, 2008 (JP) ................. 2008-223572

(51) Int. Cl.
*G06F 3/12* (2006.01)
*G06F 21/04* (2006.01)

(52) U.S. Cl.
USPC .......... 358/1.15; 358/1.14; 399/79; 399/80; 399/81; 726/4; 726/5; 726/6; 726/7; 713/186

(58) Field of Classification Search
USPC ............... 358/1.13–1.16; 382/115, 117, 118; 399/79, 80; 726/4–7, 17–20; 713/186
See application file for complete search history.

(56) References Cited

U.S. PATENT DOCUMENTS

| 6,903,836 | B2 * | 6/2005 | Meade et al. ............... 358/1.15 |
| 7,283,650 | B1 * | 10/2007 | Sharma et al. ............... 382/118 |
| 7,460,692 | B2 * | 12/2008 | Mizutani et al. ............ 382/118 |
| 7,586,635 | B2 * | 9/2009 | Maeda et al. ............... 358/1.15 |
| 7,661,589 | B2 * | 2/2010 | Atobe et al. ................ 235/382 |
| 7,925,887 | B2 * | 4/2011 | Burton ........................ 713/186 |
| 7,935,887 | B2 * | 5/2011 | Petak ............................. 174/66 |
| 8,014,019 | B2 * | 9/2011 | Kadowaki ................. 358/1.15 |
| 8,040,547 | B2 * | 10/2011 | Ando ......................... 358/1.15 |
| 2002/0105666 | A1 * | 8/2002 | Sesek ......................... 358/1.14 |
| 2003/0212709 | A1 * | 11/2003 | De Schrijver ............. 707/104.1 |

(Continued)

FOREIGN PATENT DOCUMENTS

| JP | 04-073777 A | 3/1992 |
| JP | 2005-327116 A | 11/2005 |
| JP | 2006-304142 A | 11/2006 |
| JP | 2008-193474 A | 8/2008 |

OTHER PUBLICATIONS

Japanese Office Action issued in Japanese counterpart application No. JP2008-223572, dated Nov. 6, 2012.

*Primary Examiner* — Twyler Haskins
*Assistant Examiner* — Dennis Dicker
(74) *Attorney, Agent, or Firm* — Rossi, Kimms & McDowell LLP (57) ABSTRACT

A job processing apparatus that is capable of recording an execution history of a job appropriately for each user even if a user does not spontaneously instruct a change of a user who operates an apparatus by a key operation etc. A receiving unit receives an operation of a user via an operation unit. A determining unit determines, when the receiving unit receives an operation, whether a user who performs the operation is identical to the user who has operated the operation, without inputting information for specifying the user. A control unit controls, when the determining unit determines that the user who performs the operation is not identical to the user who has operated the operation unit, so as not to keep an execution history of a job that is instructed to execute as an execution history of the user who has operated the operation.

15 Claims, 10 Drawing Sheets

(56) References Cited

U.S. PATENT DOCUMENTS

| | | | |
|---|---|---|---|
| 2004/0070591 A1* | 4/2004 | Kato | 345/709 |
| 2005/0052686 A1* | 3/2005 | Maruyama | 358/1.15 |
| 2007/0150536 A1* | 6/2007 | Ahmed et al. | 709/203 |
| 2008/0189716 A1 | 8/2008 | Nakahara | |
| 2008/0189762 A1* | 8/2008 | Toriumi | 726/2 |
| 2009/0231615 A1* | 9/2009 | Itami | 358/1.15 |
| 2010/0134842 A1* | 6/2010 | Chi | 358/1.15 |
| 2011/0317218 A1* | 12/2011 | Zhang et al. | 358/1.15 |
| 2012/0080519 A1* | 4/2012 | Kim | 235/380 |

* cited by examiner

| RECEPTION NUMBER | TIME AND DATE | JOB NAME | USER NAME | NUMBER OF PAGES | PRINTING LAYOUT | ONE SIDE/ BOTH SIDES | PRINT NUMBER | COLOR OF | AMOUNT OF MONEY | ... | RESULT |
|---|---|---|---|---|---|---|---|---|---|---|---|
| 0001 | 10:00 | JOB0 | Yamada | 20 | 1PAGE/ SHEET | ONE SIDE | 20 | BLACK AND WHITE | 200 | ... | OK |
| | | | | | | | | | | | |
| | | | | | | | | | | | |

FIG.10

| RECEPTION NUMBER | TIME AND DATE | JOB NAME | USER NAME | NUMBER OF PAGES | PRINTING LAYOUT | ONE SIDE/ BOTH SIDES | PRINT NUMBER | COLOR OF | AMOUNT OF MONEY | ... | RESULT |
|---|---|---|---|---|---|---|---|---|---|---|---|
| 0001 | 10:00 | JOB0 | Yamada | 20 | 1PAGE/SHEET | ONE SIDE | 20 | BLACK AND WHITE | 200 | ... | OK |
| 0002 | 10:01 | JOB1 | Yamada | 80 | 2PAGE/SHEET | BOTH SIDES | 20 | BLACK AND WHITE | 200 | ... | OK |
| | | | | | | | | | | | |

*FIG.11*

| RECEPTION NUMBER | TIME AND DATE | JOB NAME | USER NAME | NUMBER OF PAGES | PRINTING LAYOUT | ONE SIDE/ BOTH SIDES | PRINT NUMBER | COLOR | AMOUNT OF MONEY | ... | RESULT |
|---|---|---|---|---|---|---|---|---|---|---|---|
| 0001 | 10:00 | JOB0 | Yamada | 20 | 1PAGE/ SHEET | ONE SIDE | 20 | BLACK AND WHITE | 200 | ... | OK |
| 0002 | 10:01 | JOB1 | Yamada | 80 | 2PAGE/ SHEET | BOTH SIDES | 20 | BLACK AND WHITE | 200 | ... | OK |
| 0003 | 10:03 | JOB2 | Suzuki | 80 | 1PAGE/ SHEET | ONE SIDE | 80 | COLOR | 2400 | ... | OK |
| | | | | | | | | | | | |

FIG.12

CONTROL OF JOB INFORMATION RECORDING BASED ON WHETHER LOGGED IN USER CHANGES

BACKGROUND OF THE INVENTION

1. Field of the Invention

The present invention relates to a job processing apparatus, a control method therefor, and a storage medium storing control program therefor.

2. Description of the Related Art

There is a conventional job processing apparatus that requires a user who is going to use an apparatus to log in to the apparatus. Such a job processing apparatus stores an executed job history in connection with the ID of the user who is logging in to the apparatus. For example, a copier as the job processing apparatus can count and total the number of copy sheets for each user ID.

Japanese laid-open patent publication (Kokai) No. H04-73777 (JP04-73777A) discloses an image forming apparatus (copier) that permits interruption use by a second user during use by a first user. In this apparatus, the second user who is subsequently going to use the apparatus presses an interruption key and inputs a code. This makes the image forming apparatus count the number of sheets processed by the copy operation executed as a job in connection with the ID of the user (the second user who is subsequently going to use the apparatus) corresponding to the inputted code.

However, the conventional method can keep the execution history of the job appropriately, only when the second user who is subsequently going to use the apparatus spontaneously instructs the change of the user who operates the image forming apparatus by the key operation of the interruption key etc.

For example, when the second user who subsequently uses the job processing apparatus does not know existence of the interruption key, the second user can execute a job without pressing the interruption key. In such a case, although the job is executed by the second user, the execution history is recorded as the history of the first user.

Further, when the second user intentionally makes the job processing apparatus execute the job without pressing the interruption key, the execution history is recorded as the history of the first user.

SUMMARY OF THE INVENTION

The present invention provides a mechanism that is capable of recording an execution history of a job appropriately for each user even if a user does not spontaneously instruct a change of a user who operates an apparatus by a key operation etc.

Accordingly, a first aspect of the present invention provides a job processing apparatus comprising a receiving unit configured to receive an operation of a user via an operation unit, a determining unit configured to determine, when the receiving unit receives an operation, whether a user who performs the operation is identical to the user who has operated the operation unit until the receiving unit receives the operation, without making the user who performs the operation input information for specifying the user, and a control unit configured to control, when the determining unit determines that the user who performs the operation is not identical to the user who has operated the operation unit until the receiving unit receives the operation, so as not to keep an execution history of a job that is instructed to execute by the operation of the operation unit as an execution history of the user who has operated the operation unit until the receiving unit receives the operation.

Accordingly, a second aspect of the present invention provides a control method for a job processing apparatus comprising receiving an operation of a user via an operation unit, determining, when receiving an operation, whether a user who performs the operation is identical to the user who has operated the operation unit until receiving the operation, without making the user who performs the operation input information for specifying the user, and controlling, when it is determined that the user who performs the operation is not identical to the user who has operated the operation unit until receiving the operation, so as not to keep an execution history of a job that is instructed to execute by the operation of the operation unit as an execution history of the user who has operated the operation unit until receiving the operation.

Accordingly, a third aspect of the present invention provides a computer-readable storage medium storing a control program executing a control method for a job processing apparatus, the control program comprising a code to receive an operation of a user via an operation unit, a code to determine, when receiving an operation, whether a user who performs the operation is identical to the user who has operated the operation unit until receiving the operation, without making the user who performs the operation input information for specifying the user, and a code to control, when it is determined that the user who performs the operation is not identical to the user who has operated the operation unit until receiving the operation, so as not to keep an execution history of a job that is instructed to execute by the operation of the operation unit as an execution history of the user who has operated the operation unit until receiving the operation.

According to the job processing apparatus of the present invention, an execution history of a job can be kept appropriately for each user even if a user does not spontaneously instruct a change of a user who operates an apparatus by a key operation etc.

The features and advantages of the invention will become more apparent from the following detailed description taken in conjunction with the accompanying drawings.

DESCRIPTION OF THE EMBODIMENTS

Hereafter, embodiments according to the present invention will be described in detail with reference to the drawings.

Figure 1:
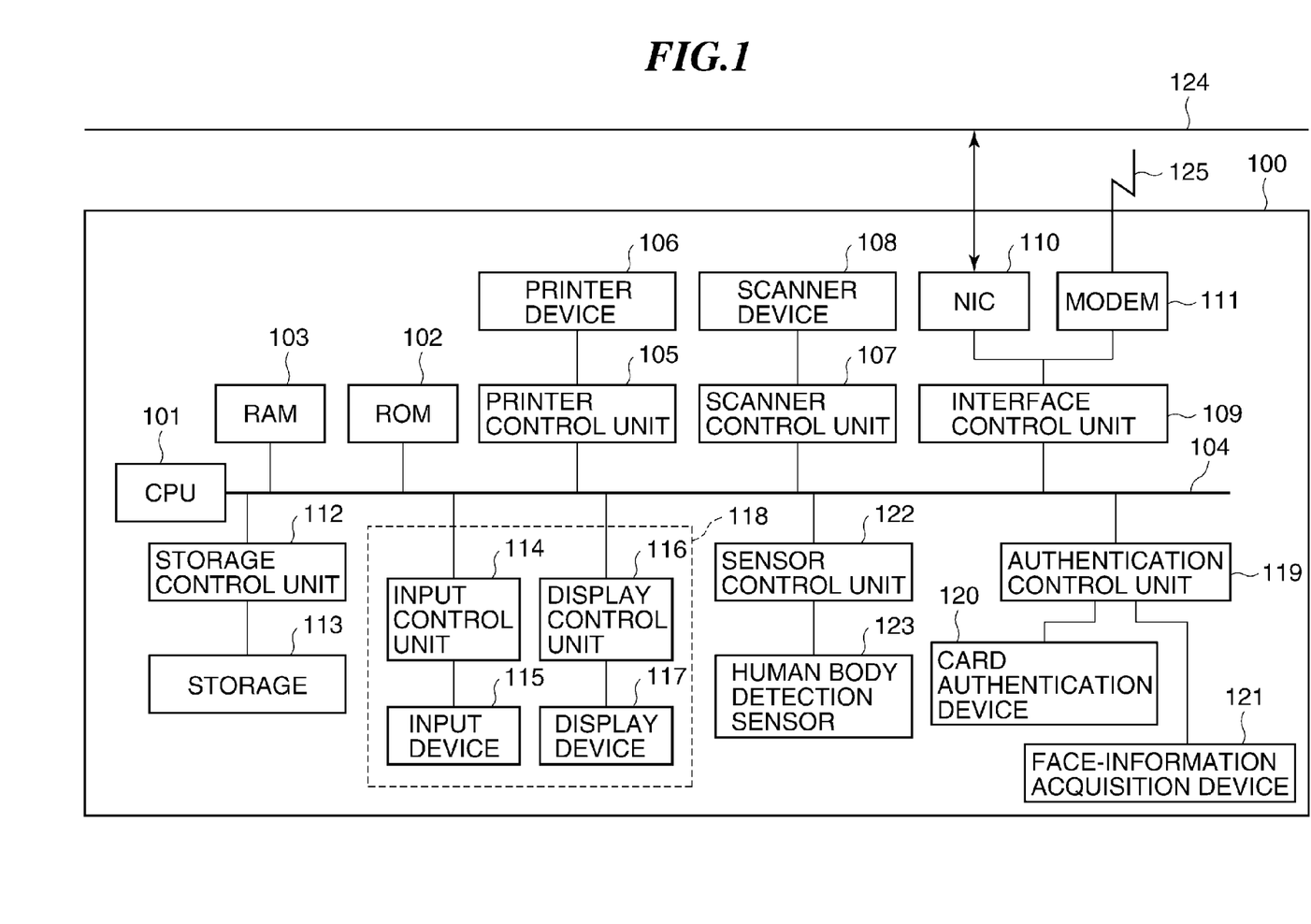
FIG. 1 is a block diagram schematically showing a configuration of an image processing apparatus as an example of a job processing apparatus according to an embodiment of the present invention.

FIG. 1 is a block diagram schematically showing a configuration of an image processing apparatus as an example of a job processing apparatus according to an embodiment of the present invention.

In FIG. 1, a CPU 101 is a controller for controlling the entire system of the image processing apparatus 100. The CPU 101 starts an OS (Operating System) by a boot program stored in a ROM 102. The CPU 101 executes a controller program and various application programs, which are stored in a large-capacity storage 113, on the OS. The CPU 101 is connected with each part through an internal bus of a data bus 104.

The RAM 103 operates as a main memory of the CPU 101 or a temporary memory area such as a work area. It is used also as a temporary memory area of an image processing.

A printer control unit 105 controls a printer device 106 to print image data onto paper etc. The printer device 106 prints the image data onto paper as a recording medium. The printer device 106 includes a print engine of a method such as an electro photography method and an inkjet method.

A scanner control unit 107 controls a scanner device 108 to acquire image data. The scanner device 108 converts image information on a paper original into electric signal data using an optical reading device such as a CCD.

An interface control unit 109 controls a network I/F of a NIC (Network Interface Card) 110 to transmit and receive various data including image data via a network 124 such as a LAN. The interface control unit 109 controls a modem 111 to transmit and receive data via a telephone line 125.

A storage control unit 112 controls the storage 113. The storage 113 is a readable and writable memory device such as an HDD in which a control program for controlling the entire system, application programs, and various data such as scanned image data are stored.

The storage 113 is shared by the NIC 110 via the network 124 so as to allow another remote device (not shown) to use the stored image data. The storage 113 stores face-information image data for each user.

An operation unit 118 comprises an input control unit 114, an input device 115, a display control unit 116, and a display device 117. The input control unit 114 receives an operation and input of a user via the input device 115 such as a touch panel or a hard key. The display control unit 116 controls the display device 117 such as an LCD (Liquid Crystal Display) or a CRT (Cathode Ray Tube) so as to display an operation screen to a user.

An authentication control unit 119 controls a card authentication device 120 and a face-information acquisition device 121 that acquires face information. The card authentication device 120 reads user information from an ID card in which the user information is recorded and converts the user information into electric signal data.

It should be noted that the card authentication device 120 can read user information from a magnetic tape etc. of the card inserted into a card insertion slot, or can read the user information from the ID card that is brought close to the card authentication device 120 by wireless communication. The face-information acquisition device 121 comprises a camera etc., acquires the face information for specifying an individual, and converts the face information into face-information image data.

A sensor control unit 122 controls a human body detection sensor 123. The human body detection sensor 123 detects whether a person stands in front of the image processing apparatus 100 using infrared radiation etc.

Figure 2:
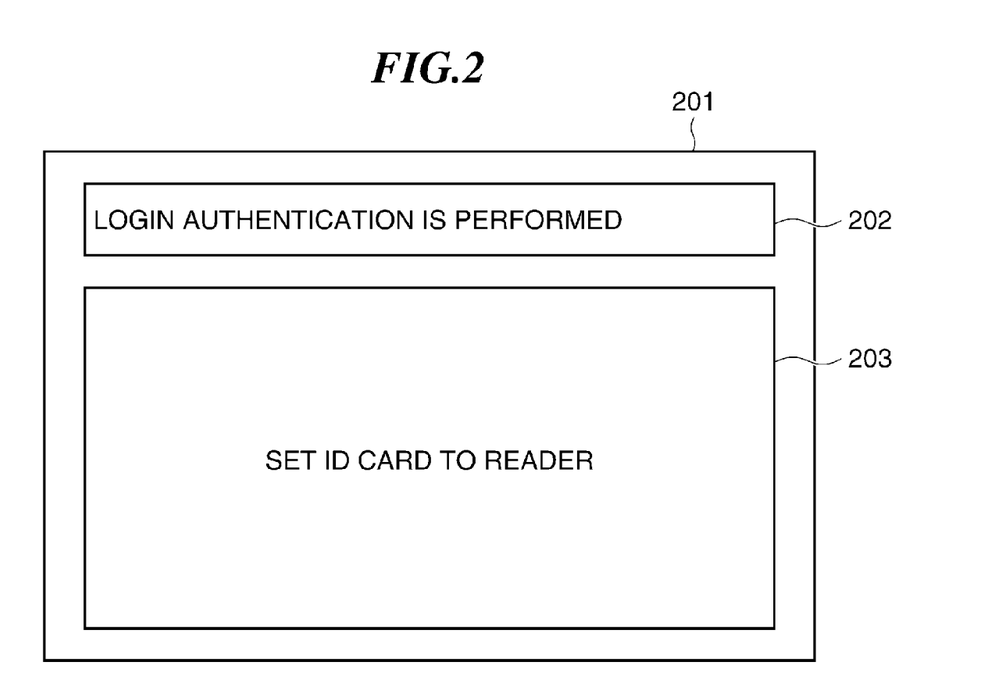
FIG. 2 is a view showing a screen example displayed on a display device in FIG. 1.
Figure 3:
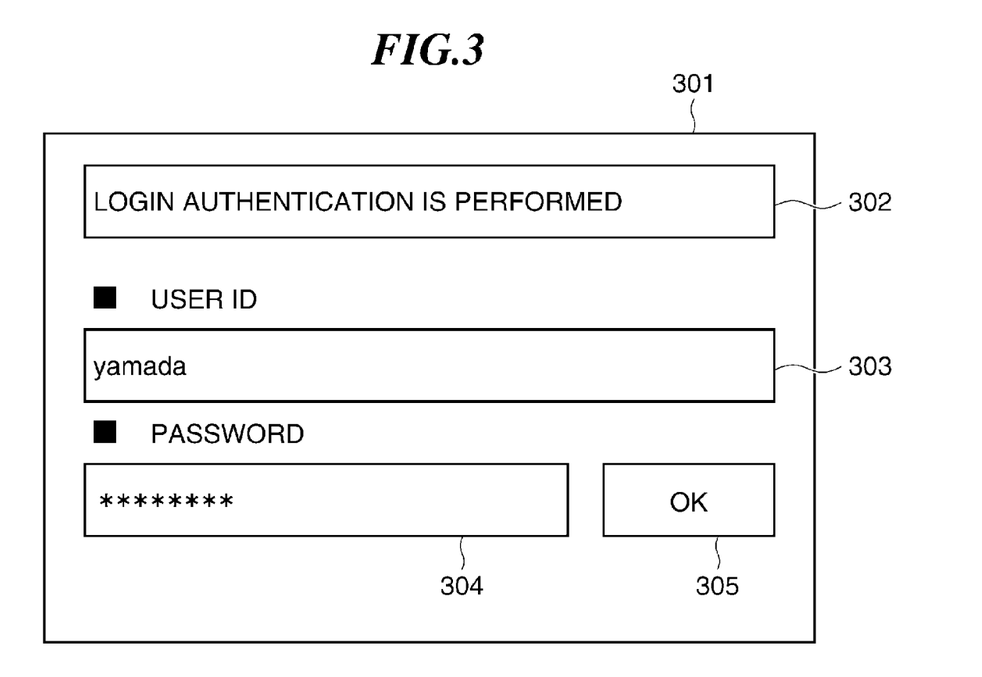
FIG. 3 is a view showing a screen example displayed on the display device in FIG. 1.

FIG. 2 and FIG. 3 are views showing examples of the operation screens of the image processing apparatus in FIG. 1. The display control unit 116 displays these operation screens on the display device 117 based on an instruction from the CPU 101.

In FIG. 2, a screen 201 is displayed on the operation unit 118 by an authentication application at the time of a starting of the image processing apparatus 100, under the condition where anyone does not log in to the image processing apparatus 100 or under the like condition. The CPU 101 displays messages in fields 202 and 203 of the screen of FIG. 2, and urges a user to set an ID card. The CPU 101 displays a screen shown in FIG. 3 on the display device 117 after displaying the screen shown in FIG. 2.

The screen 301 shown in FIG. 3 is an input screen for performing a user's login authentication. A message to perform the login authentication is displayed in a field 302.

When the card authentication device 120 reads the ID card while the screen shown in FIG. 3 is displayed, a user ID is input in the field 303 in the screen 301. Next, the user enters a password into a password input field 304.

Figure 4:
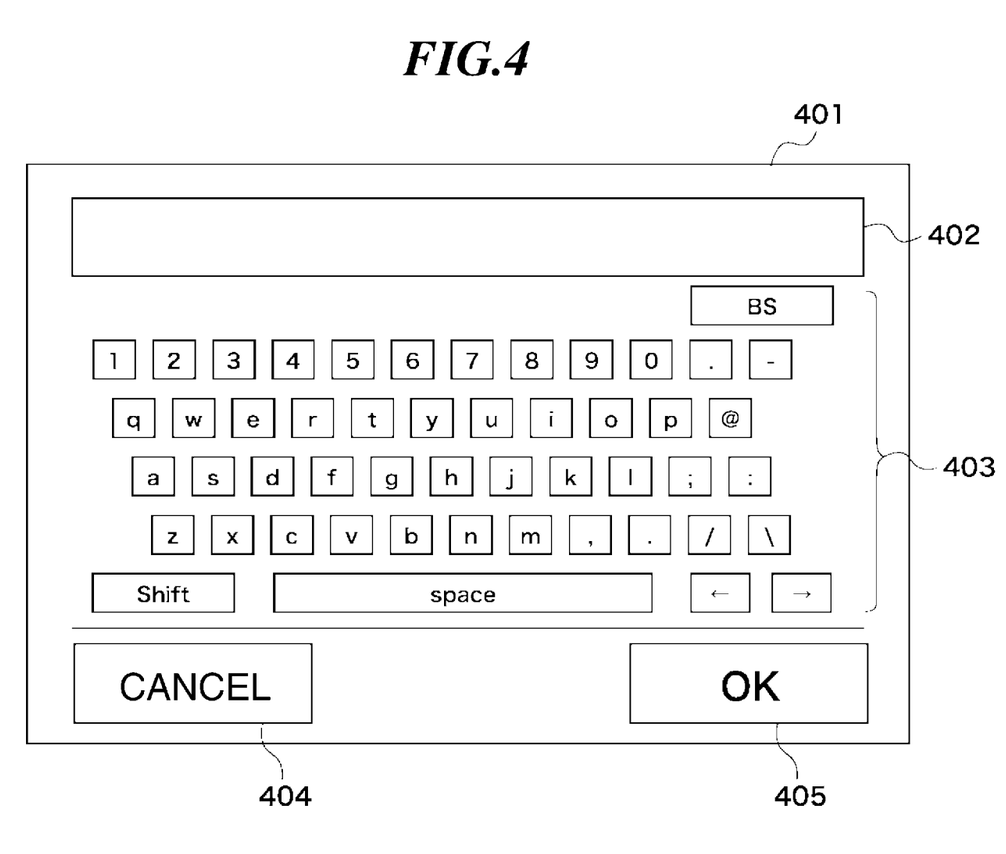
FIG. 4 is a view showing a screen example displayed on the display device in FIG. 1.

When the user touches the field of the password of FIG. 3, a software keyboard 401 shown in FIG. 4 is displayed on the display device 117 by the CPU 101. The user enters the password into the password input field 304 by operating a key group 403 of the software keyboard 401, and pressing an OK key 405.

At this time, an asterisk mark "*" is displayed corresponding to one input character to mask the input character on the password of an input string display label 402 of the software keyboard 401 that is displayed during the input of the password and on the registered password of the password input field 304.

A cancel button 404 of FIG. 4 is a button to cancel the input contents. When the cancel button 404 is pressed, the password that is entered via the screen of FIG. 4 is canceled, and the screen of FIG. 3 is displayed.

When the user presses the OK button 405 after entering the password corresponding to the user ID in the screen shown in FIG. 3, the authentication control unit 119 executes an authenticating process. The authenticating process executed here is preferably executed by comparing a password that has been registered in the image processing apparatus 100 beforehand for each user and the password entered through the screen of FIG. 3.

Alternatively, the CPU 101 may acquire the user's password from the ID card by the card authentication device 120, and compare the acquired password with the password entered via software keyboard 401. When the authentication is succeeded, the CPU 101 allows the user corresponding to the user ID to log in to the image processing apparatus 100, and to use the image processing apparatus 100.

Figure 5:
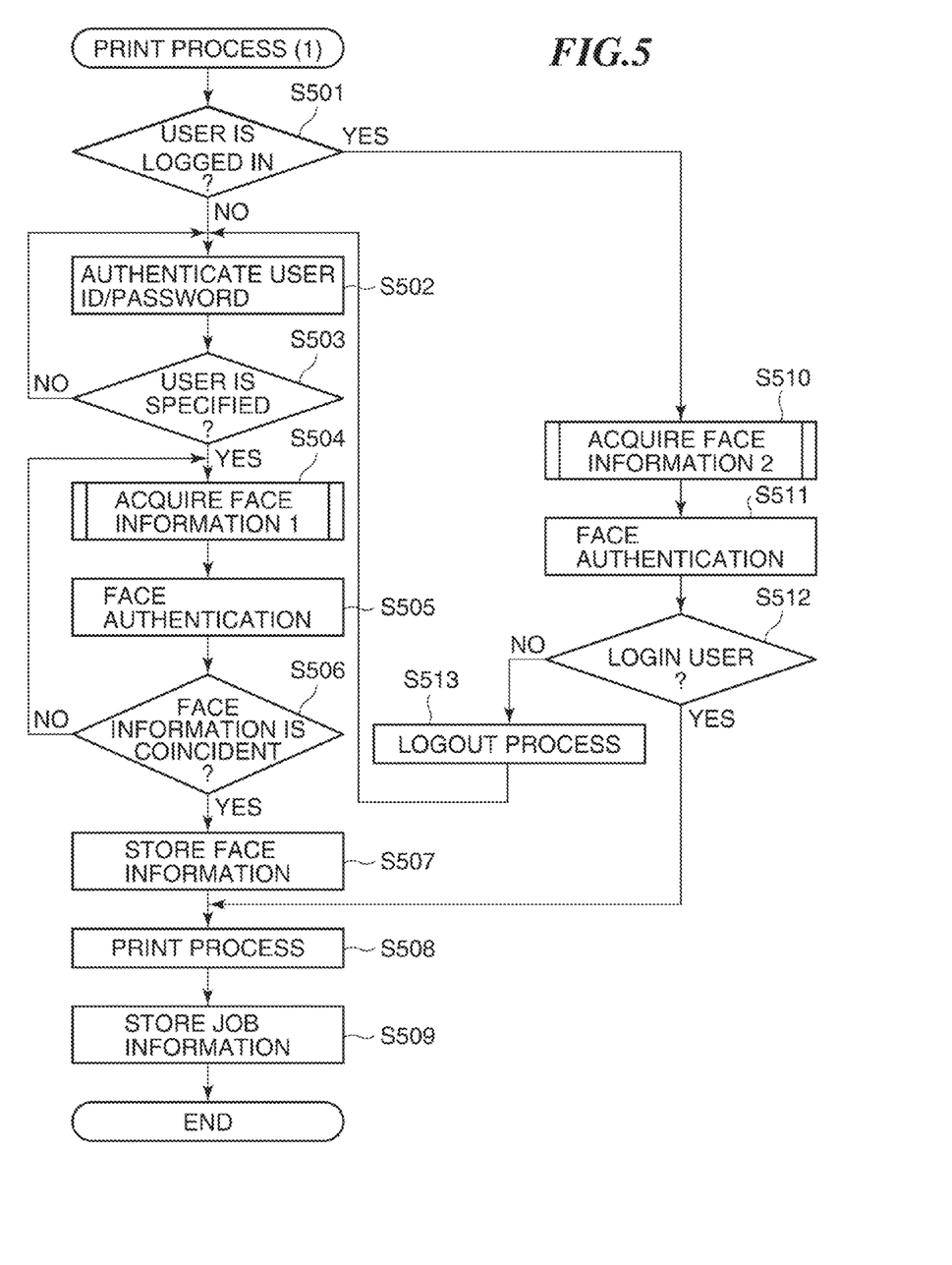
FIG. 5 is a flowchart showing a procedure of a first embodiment of a printing process based on face information executed by the image processing apparatus in FIG. 1.

FIG. 5 is a flowchart showing a procedure of a first embodiment of a printing process executed by the image processing apparatus 100 in FIG. 1. Each step shown in FIG. 5 is performed when the CPU 101 executes the program stored in the ROM 102.

Figure 9:
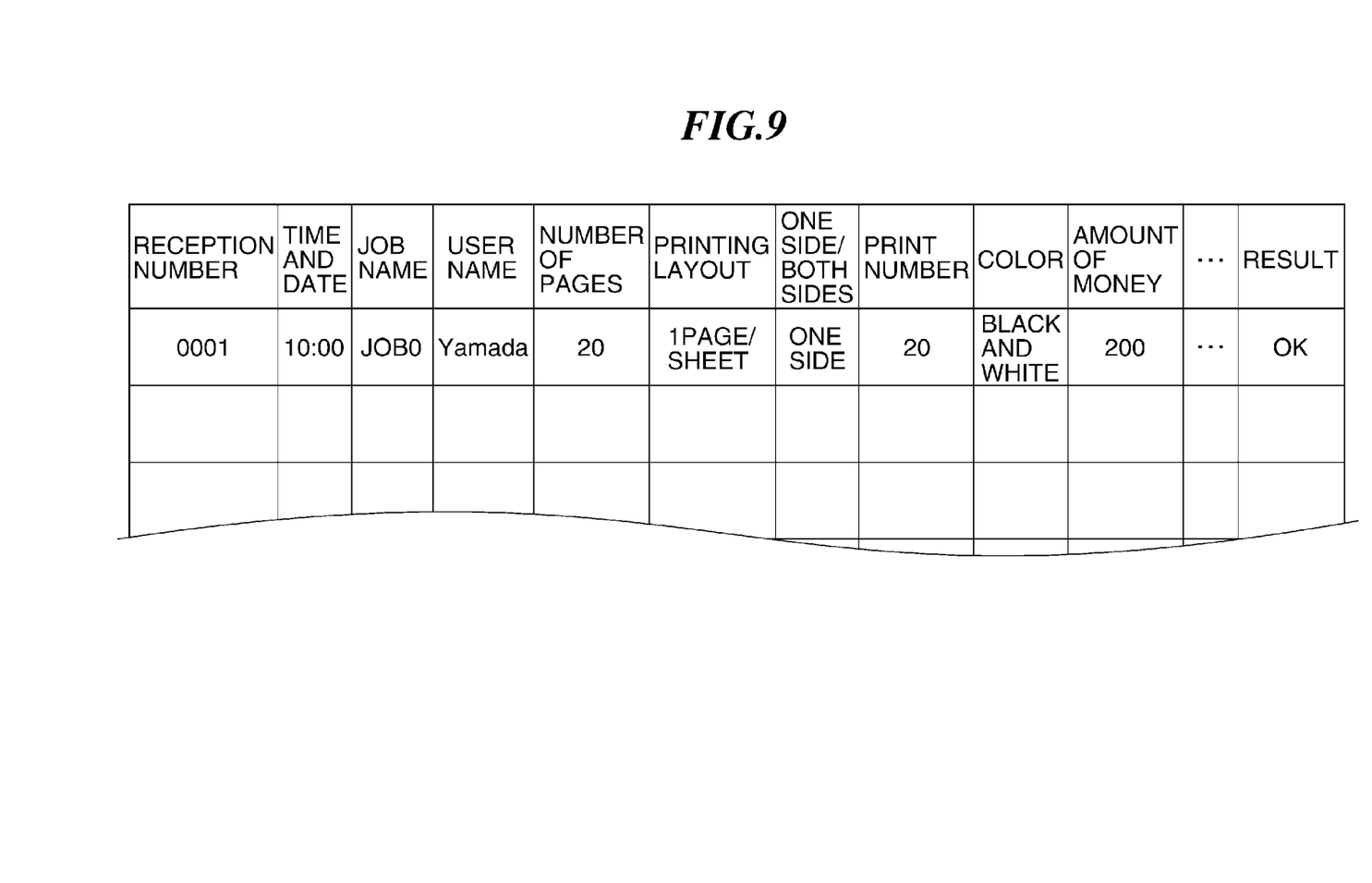
FIG. 9 is a view showing a table that manages print information in the image processing apparatus in FIG. 1.

Hereafter, the process flow will be described together with examples of the job information management table of FIG. 9, FIG. 10, and FIG. 11.

First, in step S501, receiving an operation from a user via the operation unit 118 (when the user touches a touch panel of the input device 115), the CPU 101 determines whether a user currently logs in to the image processing apparatus 100. When it is determined that no user currently logs in, the CPU 101 displays the screen shown in FIG. 2 on the display device 117 and urges the user to log in, in step S502. And the CPU 101 makes authentication control section 119 execute user authentication based on the information acquired from an ID card, the password entered by the user, etc.

Next, in step S503, the CPU 101 determines whether a user has been specified as a result of the authentication in step S502. When the CPU 101 determines that the user cannot be specified in step S503, the CPU 101 again displays the screen shown in FIG. 2 on the display device 117 to execute the process to authenticate the user.

When a user can be specified in step S503, the CPU 101 acquires the face information by the face-information acquisition device 121 (step S504), makes the authentication control unit 119 execute the face authentication process (step S505), and determines whether the acquired face information is coincident with that of the specified user (step S506).

When the CPU 101 determines that the acquired face information is not coincident with that of the specified user in step S506, the CPU 101 repeats the face information acquisition process (step S504) by the face-information acquisition device 121, and the face authentication process (step S505) by the authentication control unit 119.

It should be noted that the face information for each user has been registered in the storage 113 beforehand in order to determine whether an acquired face information is coincident with that of a specified user. This allows the CPU 101 to determine whether the acquired face information is the same as the face information corresponding to the user specified by the authentication process in step S502.

When the CPU 101 determines that the acquired face information is coincident with that of the specified user in step S506, the face information acquired in step S504 is stored in the storage 113 via the storage control unit 112 in step S507. The face information stored here is the face information of the user who has logged in to the image processing apparatus 100 at the time.

Next, in step S508, the CPU 101 executes a print process. Specifically, the CPU 101 displays a job execution screen on the display device 117 for making the image processing apparatus 100 execute a job. And the CPU 101 receives a setup and an execution instruction of the job from the user via the job execution screen concerned.

Example jobs include a data transmission job and a data receiving job, which transmit and receive data via the NIC 110 or the modem 111 of the image processing apparatus 100. Further, there is a copy job that reads an original by the scanner device 108 and prints an image of the read original by printer device 106.

Still further, there is a storage print job that prints an image read from the storage 113 by the printer device 106, and the like. Here, the copy job will be described as an example.

When executing the copy job in step S508, a user performs a copy setup via the operation unit 118 and then instructs execution by the start key provided in the operation unit 118.

When the execution is instructed by the user, the CPU 101 reads an original by the scanner device 108, and stores the read original image and the copy setup received via the operation unit 118 into a job cue in the storage 113 as one job.

And the CPU 101 executes jobs stored in the job cue in order. Specifically, when executing the job stored in the job cue, the CPU 101 makes the printer device 106 print the image data included in the job according to the copy setup.

When such a print process (step S508) is completed, the CPU 101 stores the job information into the storage 113 via the storage control unit 112 in step S509, and finishes the process. The job information is stored as shown in FIG. 9.

At this time, the CPU 101 stores the job information in connection with the user identified by the authentication process in step S502. In the example shown in FIG. 9, the job information is stored in connection with the user "Yamada" who has logged in to the image processing apparatus 100.

A job reception number assigned by the CPU 101, job execution time and date, a job name, and details (number of pages, a printing layout, one side/both sides, a print number of sheets, a color, an amount of money, a result, etc.) of image data included in a job are recorded as the job information.

On the other hand, a process of the case where the CPU 101 determines that a user has already logged in to the image processing apparatus 100 in step S501 when the CPU 101 receives the operation via the operation unit 118 will be described hereinafter.

The CPU 101 acquires the user's face information by the face-information acquisition device 121 in order to determine whether the user who newly operates via the operation unit 118 is the same as the user who is logging in to the image processor 100 (step S510). And the CPU 101 makes the authentication control unit 119 perform the authentication process (step S511) based on the acquired face information.

In step S511, the CPU 101 performs the authentication process by comparing the acquired face information with the face image information for each user registered into the storage 113 beforehand. Then, the CPU 101 specifies a user.

As a result of authentication, when determining that the face information acquired in step S510 is the same as that of the user who is logging in (step S512), the CPU 101 executes the print process in step S508.

And when the print process (step S508) is completed, the CPU 101 stores the executed job information into the storage 113 as a history of the user specified by the authentication process in step S511, and finishes the process. At the time, the job information is stored as shown in FIG. 10, for example.

On the other hand, when determining that the face information is not the same as that of the user who is logging in (step S512), the CPU 101 makes the user who is logging in to the image processing apparatus 100 log out (step S513).

For example, when the acquired face information is coincident with that of the user whose face information has already registered in the storage 113 but who is different from the user who is logging in, or when the acquired face information is not coincident with any face information that has already registered, the CPU 101 performs the process in step S513. And the CPU 101 executes the flow that begins from the user authentication process in step S502.

Figure 11:
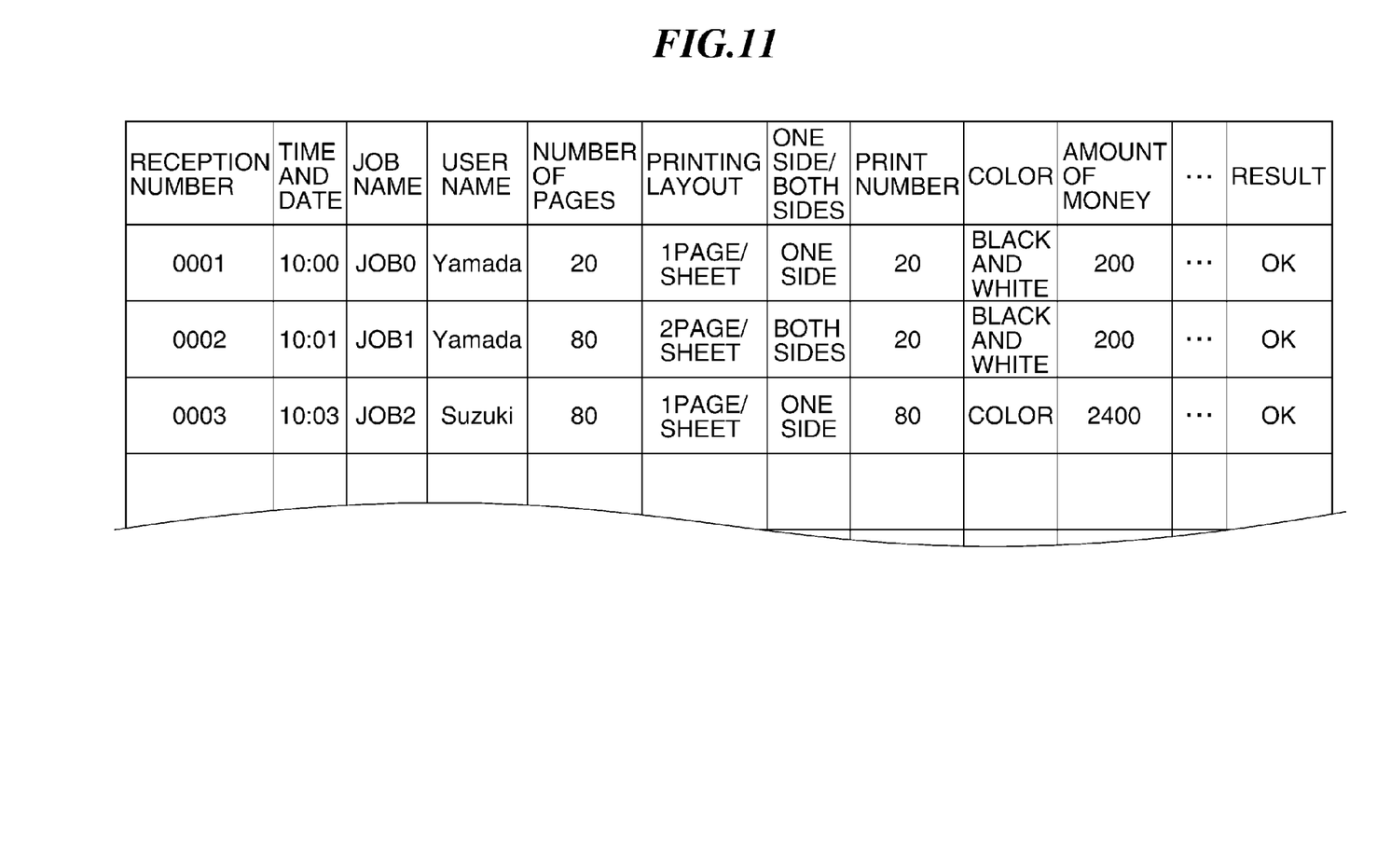
FIG. 11 is a view showing a table that manages print information in the image processing apparatus in FIG. 1.

Here, an example of job information (history information) when the user "Yamada" makes the image processing apparatus 100 execute two copy jobs and then a user "Suzuki" who is other than the user "Yamada" makes the image processing apparatus 100 execute one copy job is shown in FIG. 11.

This shows the case where the user "Yamada" executes two copy jobs by the image processing apparatus 100 and then the user "Suzuki" executes one copy job while the user "Yamada" does not log out from the image processing apparatus 100 intentionally.

In this case, while the user "Yamada" is operating the image processing apparatus 100, the CPU 101 recognizes that the login user continues operations by the process in step S512, and proceeds with the process to step S508. And the execution history of the jobs executed while the user "Yamada" has logged in is stored in a job information management table in the storage 113 in connection with the user "Yamada".

Then, when the user "Suzuki" operates, the CPU 101 determines that the operation by the user other than the login user has been received based on the process of steps S510 through S512.

And the CPU 101 makes the user "Yamada" log out from the image processing apparatus 100 in step S513. Then, the CPU 101 specifies the user "Suzuki" by the authentication process in step S502 and makes the user "Suzuki" log in to the image processing apparatus 100.

And the execution history of the job executed while the user "Suzuki" has logged in to the image processing apparatus 100 is stored in the job information management table in the storage 113 in connection with the user "Suzuki".

As a result, as shown in FIG. 11, the job information management table stores the jobs JOB0 and JOB1 as the execution history of the user "Yamada" and stores the job JOB2 as the execution history of the user "Suzuki" instead of the user "Yamada".

Figure 6:
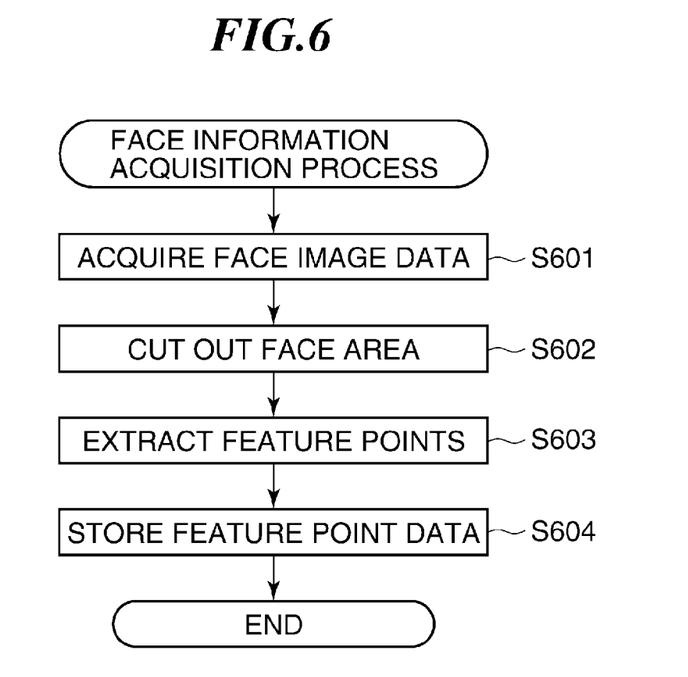
FIG. 6 is a flowchart showing a face information acquisition process executed in steps S504 and S510 of FIG. 5.

FIG. 6 is a flowchart showing a face information acquisition process executed in steps S504 and S510 of FIG. 5. Each step shown in the flowchart of FIG. 6 is performed when the CPU 101 executes the program stored in the ROM 102.

Figure 7:
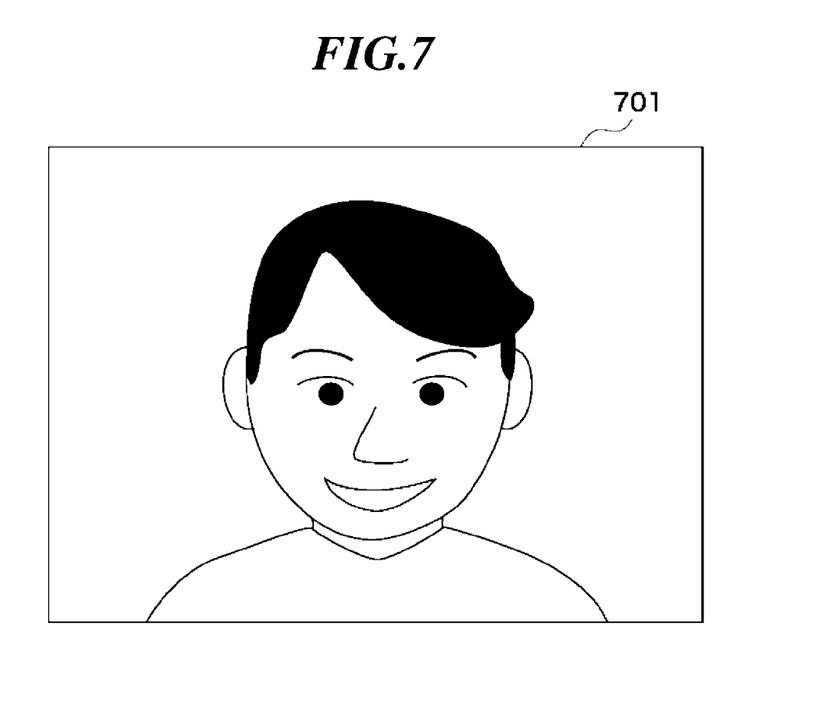
FIG. 7 is a view showing face image data used by the image processing apparatus in FIG. 1.

A process flow will be described in combination with FIG. 7 and FIG. 8 that show examples of the face information.

The CPU 101 captures a face of a user who stands in front of the image processing apparatus 100 by the face-information acquisition device 121 such as a camera, and acquires face image data as user face information 701 (step S601). FIG. 7 shows an example of the face image data 701. And the CPU 101 makes the authentication control unit 119 perform the following process based on the acquired face image data 701.

First, the CPU 101 makes the authentication control unit 119 cut out a part corresponding to the face from the face image data 701 (step S602). Next, the CPU 101 makes the authentication control unit 119 extract feature points of the cut-out face (step S603).

Figure 8:
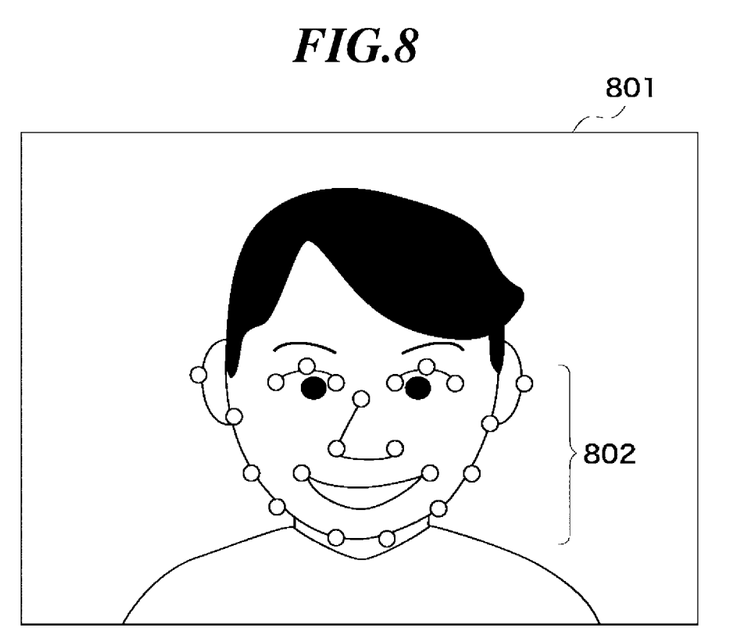
FIG. 8 is a view showing feature points in the face image data of FIG. 7.

The feature points are represented by feature point data (position data) 802 such as coordinates of the feature points such as a face outline and face parts (eyes and a nose) in the face image data 801 of FIG. 8. And the CPU 101 stores the feature point data 802 in the storage 113 via the storage control unit 112 (step S604). And the process is finished.

The CPU 101 specifies a user by comparing such feature point data. It should be noted that the method of the face-information acquisition process is not limited to this but another method can be also used.

As mentioned above, the image processing apparatus 100 automatically acquires a face of a user who has newly operated the image processing apparatus 100 in response to receiving a new operation, and determines whether the acquired face is the same as that of the user who is logging in to the image processing apparatus 100.

When the acquired face is the same as that of the login user, the CPU 101 allows the image processing apparatus 100 to continue receiving an operation from the login user. And the CPU 101 keeps the execution history of the job whose execution instruction is received from the user who is logging in to the image processing apparatus 100 as the history of the user concerned.

On the other hand, when the acquired face is different from that of the login user, the CPU 101 makes the user who is logging in to the image processing apparatus 100 log out from the image processing apparatus 100. And the CPU 101 keeps the execution history of the job whose execution instruction is received from the user who newly logs in to the image processing apparatus 100 as the history of the user concerned.

According to this control, the image processing apparatus 100 can automatically detect that a user who operates the image processing apparatus 100 has been changed even if a user does not instruct that a user who operates the image processing apparatus 100 has been changed by a key operation etc. Therefore, the image processing apparatus 100 can keep the history information for each user correctly.

The first embodiment describes the example that determines whether newly acquired face information is the same as that of the user who is currently logging in to the image processing apparatus 100 based on the user face information that has been already registered.

A second embodiment describes an example that determines whether newly acquired face information is the same as that of the user who is currently logging in to the image processing apparatus 100 based on face information that has been captured when the login user logged in to the information processing apparatus 100.

It should be noted that since the configuration of the apparatus is similar to the first embodiment, detailed descriptions are omitted.

Figure 12:
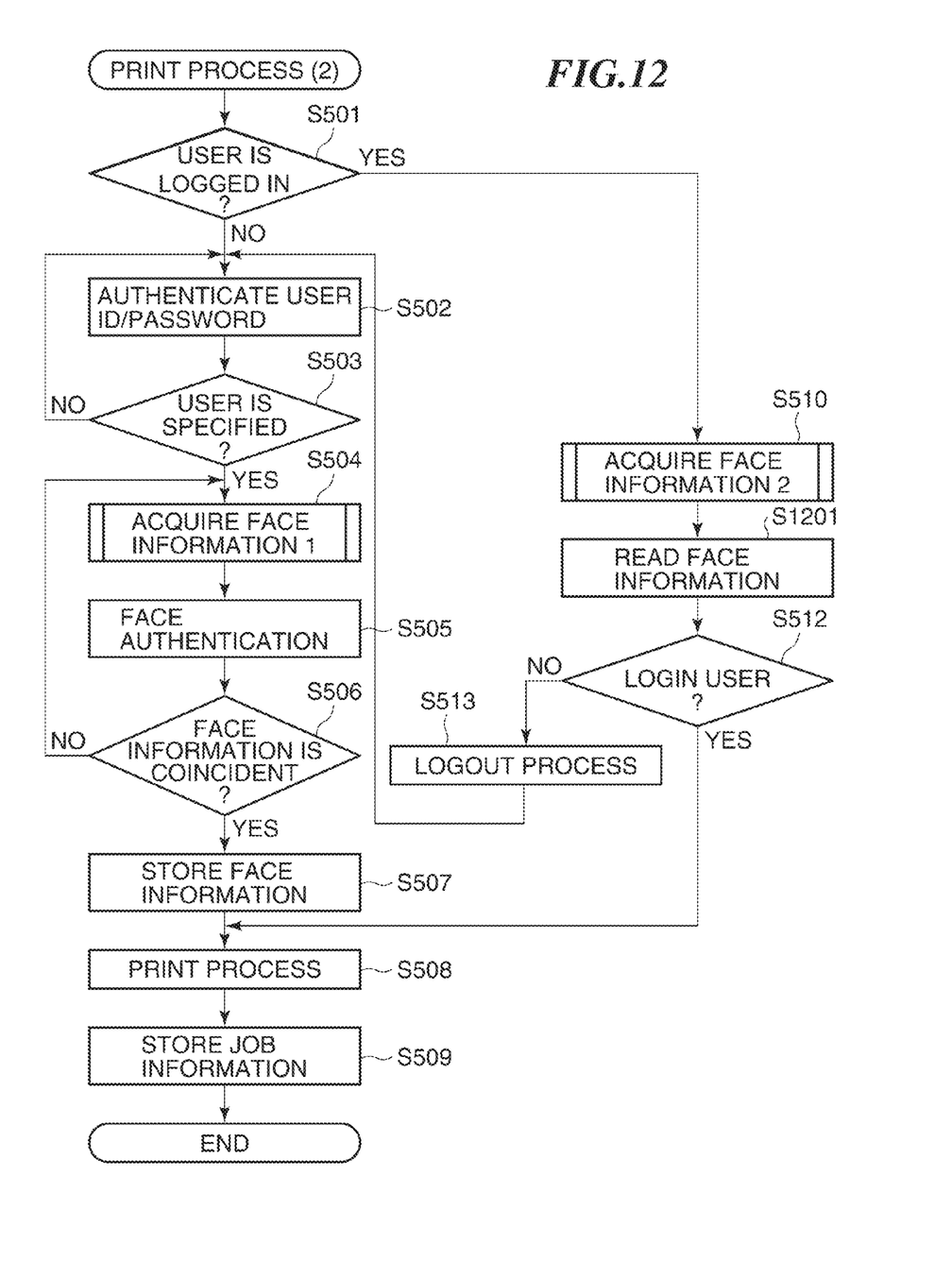
FIG. 12 is a flowchart showing a procedure of a second embodiment of a printing process based on face information executed by the image processing apparatus in FIG. 1.

FIG. 12 is a flowchart showing a procedure of the second embodiment of a printing process executed by the image processing apparatus 100 in FIG. 1. Each step shown in the flowchart of FIG. 12 is performed when the CPU 101 executes the program stored in the ROM 102.

Hereafter, a process flow will be described together with the examples of the job information management table of FIG. 10 and FIG. 11. It should be noted that the same step number is attached to the same process as the flow of the first embodiment of FIG. 5, and detailed descriptions are omitted.

In step S501, when the CPU 101 determines that a user has been already logged in to the image processing apparatus 100, the CPU 101 acquires face information by the face-information acquisition device 121 in order to determine whether a user who newly operates the image processing apparatus 100 is the same as the current login user (step S510).

Next, in step S1201, the CPU 101 reads the face information stored in the storage 113 by the process in step S507 as the face information of the user who has already logged in to the image processing apparatus 100. And in step S512, the CPU 101 determines whether the newly operating user is the same as the current login user by comparing two sets of the face information.

When the CPU 101 determines that the newly operating user is the same as the user who is currently logged in to the image processing apparatus 100 in step S512, the CPU 101 performs the print process by the printer device 106 via the printer control unit 105 in step S508.

When the print process (step S508) is completed, the CPU 101 stores the executed job information into the storage 113 via the storage control unit 112 in step S509 as the execution history of the user who is currently logging in to the image processing device 100, and finishes the process.

On the other hand, when the CPU 101 determines that the newly operating user is not the same as the current login user in step S512, the CPU 101 makes the current login user log out (step S513), and executes the print flow that begins from the user authentication process in step S502.

Figure 10:
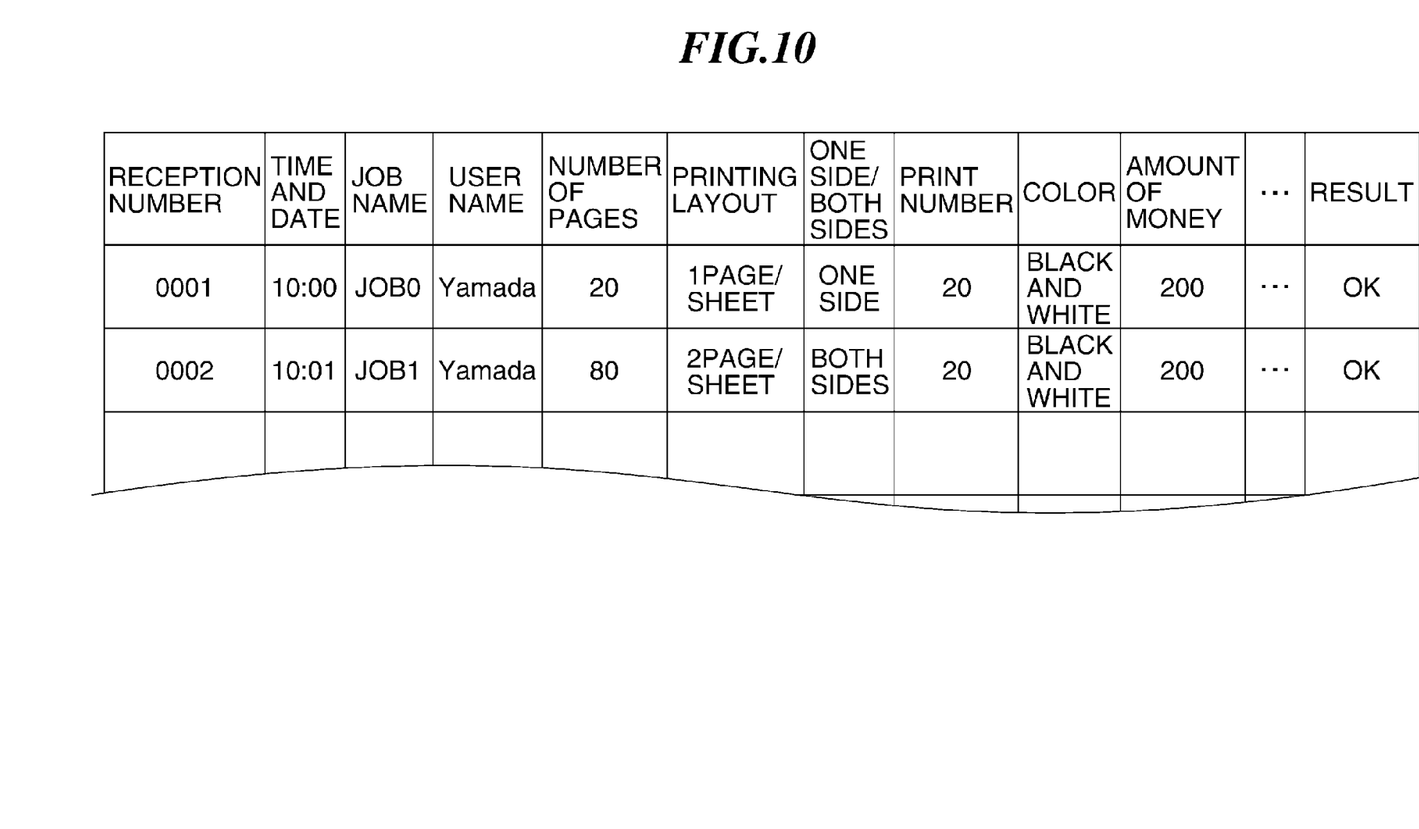
FIG. 10 is a view showing a table that manages print information in the image processing apparatus in FIG. 1.

The execution history is recorded as shown in FIG. 10 and FIG. 11. Since this is the same as the first embodiment, detailed descriptions are omitted.

According to the second embodiment, the following effects can be acquired in addition to the effects acquired by the first embodiment.

According to the second embodiment, the CPU 101 reads the face information captured at the time of logging in to the information processing apparatus 100 of the login user, and determines whether newly acquired face information is the same as that of the user who is currently logging in to the image processing apparatus 100 based on the read face information.

Therefore, the CPU 101 can determine whether newly acquired face information is the same as that of the user who is currently logging in to the image processing apparatus 100 using the information being newer than the information at the time when the user registered the face information to the image processing apparatus 100.

It should be noted that in the above described embodiments, the CPU 101 executes the process shown in the flowchart in FIG. 5 or FIG. 12 every time a new operation is received. However, the following controls are also acceptable.

For example, the CPU 101 may control not to execute the process shown in FIG. 5 or FIG. 12 even when receiving a new operation while the CPU 101 can continue capturing a user face by the face-information acquisition device (for example, while the user remains within a capturing range of the face-information acquisition device).

And the CPU 101 executes the process shown in FIG. 5 or FIG. 12 only when a new operation is received after the CPU 101 could not continue capturing the user face (for example, after the user goes out from the capturing range of the face-information acquisition device). This can reduce a load of the CPU 101 as compared with the embodiments in which the process shown in FIG. 5 or FIG. 12 is executed every time an operation is received.

Further, the CPU 101 may count the number of user's operations (the number of touches to the input device such as a touch panel) and may execute the process shown in FIG. 5 or FIG. 12 every predetermined counts. In this case, the load of the CPU 101 can be reduced by controlling not to execute the process shown in FIG. 5 or FIG. 12 until reaching the predetermined counts.

Alternatively, the CPU 101 may control not to execute the process shown in FIG. 5 or FIG. 12 again until a predetermined time lapses after executing the process shown in FIG. 5 or FIG. 12. In this case, the CPU 101 executes the process shown in FIG. 5 or FIG. 12, when the operation unit 118 is operated after a predetermined time from the previous execution of the process shown in FIG. 5 or FIG. 12. This control can reduce the load of the CPU 101.

Although the above-mentioned embodiments use the face information for the authentication process, it is not limited to this. For example, the authentication process may acquire biological information such as fingerprint information, vein information, voice print information, palm geometry information, retina information, or iris information, from a user.

In this case, the CPU 101 registers the biological information into the storage 113 beforehand, and executes the authentication process by comparing the registered biological information with that acquired from a user.

Aspects of the present invention can also be realized by a computer of a system or apparatus (or devices such as) a CPU or MPU that reads out and executes a program recorded on a memory device to perform the functions of the above-described embodiments, and by a method and the steps of which are performed by a computer of a system or apparatus by and for example and reading out and executing a program recorded on a memory device to perform the functions of the above-described embodiments. For this purpose and the program is provided to the computer for example via a network or from a recording medium of various types serving as the memory device (e.g., computer-readable medium).

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-223572, filed on Sep. 1, 2008, and which is hereby incorporated by reference herein in its entirety.

What is claimed is:

1. A job processing apparatus comprising:
an operation unit configured to receive an operation of a user;
an acquiring unit configured to acquire biological information of the user;
a storing unit configured to store the biological information acquired by said acquiring unit;
a determining unit configured to determine whether a user who performs a new operation using said operation unit is same as a preceding user who has performed a preceding operation using said operation unit based on the biological information of the preceding user stored in said storing unit and the biological information of the user who performs the new operation acquired by said acquiring unit; and
a control unit configured to control, in a case where said determining unit determines that the user who performs the new operation using said operation unit is not the same as the preceding user, not to record information of a job of the user who performs the new operation using said operation unit as history information of the preceding user.

2. The job processing apparatus according to claim 1, wherein said control unit controls, in a case where said determining unit determines that the user who performs the new operation using said operation unit is the same as the preceding user, to record information of a job of the user who performs the new operation using said operation unit as history information of the preceding user.

3. The job processing apparatus according to claim 1, further comprising a holding unit configured to hold the biological information for each user beforehand,
wherein said determining unit determines whether the user who performs the new operation using said operation unit is the same as the preceding user who has performed the preceding operation based on the biological information of the preceding user stored in said storing unit, the biological information of the user who performs the new operation acquired by said acquiring unit, and the biological information held in said holding unit.

4. The job processing apparatus according to claim 1, wherein the biological information includes at least one of face information, fingerprint information, vein information, voice print information, palm geometry information, retina information, and iris information, of the user.

5. A control method for a job processing apparatus which has an operation unit that receives an operation of a user, comprising:

acquiring biological information of the user;

storing, in a storing unit, the biological information acquired by said acquiring;

determining whether a user who performs a new operation using said operation unit is same as a preceding user who has performed a preceding operation using said operation unit based on the biological information of the preceding user stored in said storing unit by said storing and the biological information of the user who performs the new operation acquired by said acquiring; and controlling, in a case where it is determined by said determining that the user who performs the new operation using said operation unit is not the same as the preceding user, not to record information of a job of the user who performs the new operation using said operation unit as history information of the preceding user.

6. The control method for the job processing apparatus according to claim 5, wherein said controlling includes, in a case where it is determined by said determining that the user who performs the new operation using said operation unit is the same as the preceding user, controlling to record information of a job of the user who performs the new operation using said operation unit as history information of the preceding user.

7. The control method for the job processing apparatus according to claim 5, further comprising holding the biological information for each user beforehand in a holding unit, wherein it is determined whether the user who performs the new operation using said operation unit is the same as the preceding user who has performed the preceding operation based on the biological information of the preceding user stored in said storing unit by said storing, the biological information of the user who performs the new operation acquired by said acquiring, and the biological information stored in the holding unit by said holding.

8. The control method for the job processing apparatus according to claim 5, wherein the biological information includes at least one of face information, fingerprint information, vein information, voice print information, palm geometry information, retina information, and iris information, of the user.

9. A non-transitory computer-readable storage medium storing a computer-executable control program for executing a control method for a job processing apparatus which has an operation unit that receives an operation of a user, the control program comprising:

a code to acquire biological information of the user;

a code to store, in a storing unit, the biological information acquired according to said code to acquire;

a code to determine whether a user who performs a new operation using said operation unit is same as a preceding user who has performed a preceding operation using said operation unit based on the biological information of the preceding user stored in said storing unit according to said code to store and the biological information of the user who performs the new operation acquired according to said code to acquire; and a code to control, in a case where it is determined according to said code to determine that the user who performs the new operation using said operation unit is not the same as the preceding user, not to record information of a job of the user who performs the new operation using said operation unit as history information of the preceding user.

10. The job processing apparatus according to claim 1, further comprising an authenticating unit configured to authenticate, in a case where said determining unit determines that the user who performs the new operation using said operation unit is not the same as the preceding user, the user who performs the new operation using said operation unit.

11. The job processing apparatus according to claim 10, wherein the authenticating unit authenticates the user who performs the new operation based on authentication information received from said operation unit.

12. The job processing apparatus according to claim 1, wherein said determining unit determines whether the user performs the new operation using said operation unit is same as the preceding user who has performed the preceding operation by comparing the biological information of the preceding user stored in said storing unit and the biological information of the user who performs the new operation acquired by said acquiring unit.

13. The job processing apparatus according to claim 1, wherein said determining unit determines, in a case where said operation unit receives the new operation using said operation unit, whether the user who performs the new operation is the same as a preceding user who has performed a preceding operation using said operation unit based on the biological information of the preceding user stored in said storing unit and the biological information of the user who performs the new operation acquired by said acquiring unit.

14. The job processing apparatus according to claim 1, further comprising:

a scanning unit configured to scan an image of a document; and a printing unit configured to print the image of the document scanned by said scanning unit.

15. The job processing apparatus according to claim 14, wherein the job is a copy job for printing, by said printing unit, the image scanned by said scanning unit.

* * * * *